United States Patent
Bajpay et al.

(10) Patent No.: US 8,700,761 B2
(45) Date of Patent: Apr. 15, 2014

(54) METHOD AND SYSTEM FOR DETECTING AND MANAGING A FAULT ALARM STORM

(75) Inventors: Paritosh Bajpay, Edison, NJ (US); Monowar Hossain, Middletown, NJ (US); Wen-Jui Li, Bridgewater, NJ (US); Chao-Chun Luo, Colts Neck, NJ (US); Chen-Yui Yang, Marlboro, NJ (US); Daniel Zuckerman, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1227 days.

(21) Appl. No.: 12/204,495

(22) Filed: Sep. 4, 2008

(65) Prior Publication Data

US 2010/0052924 A1  Mar. 4, 2010

(51) Int. Cl.
G06F 15/173 (2006.01)

(52) U.S. Cl.
USPC .......................................................... 709/224

(58) Field of Classification Search
USPC .......................................................... 709/224
See application file for complete search history.

(56) References Cited

U.S. PATENT DOCUMENTS

| | | | |
|---|---|---|---|
| 6,253,339 B1 | 6/2001 | Tse et al. | |
| 6,513,129 B1 * | 1/2003 | Tentij et al. | 714/4.12 |
| 6,728,688 B1 | 4/2004 | Hirsch et al. | |
| 6,766,368 B1 | 7/2004 | Jakobson et al. | |
| 7,111,070 B2 * | 9/2006 | Bennett et al. | 709/237 |
| 7,284,048 B2 | 10/2007 | Jakobson et al. | |
| 2002/0029266 A1 | 3/2002 | Tse et al. | |
| 2006/0149990 A1 | 7/2006 | S. et al. | |
| 2006/0208872 A1 | 9/2006 | Yu et al. | |
| 2007/0222576 A1 | 9/2007 | Miller et al. | |
| 2008/0019286 A1 * | 1/2008 | Wurst et al. | 370/254 |

OTHER PUBLICATIONS

Jane Zupan and Deep Medhi, An Alarm Management Approach in the Management of Multi-Layered Networks, IEEE 2003, Aug. 2003, p. 77-84.

* cited by examiner

*Primary Examiner* — David X Yi
(74) *Attorney, Agent, or Firm* — Hoffmann & Baron, LLP

(57) ABSTRACT

A method and system of managing network alarms including associating an alarm type with a plurality of network alarms using information associated with the plurality of network alarms, the information comprising a quantity of the plurality of network alarms and a cause of the network alarms; and processing the plurality of network alarms based on the alarm type associated therewith.

16 Claims, 8 Drawing Sheets

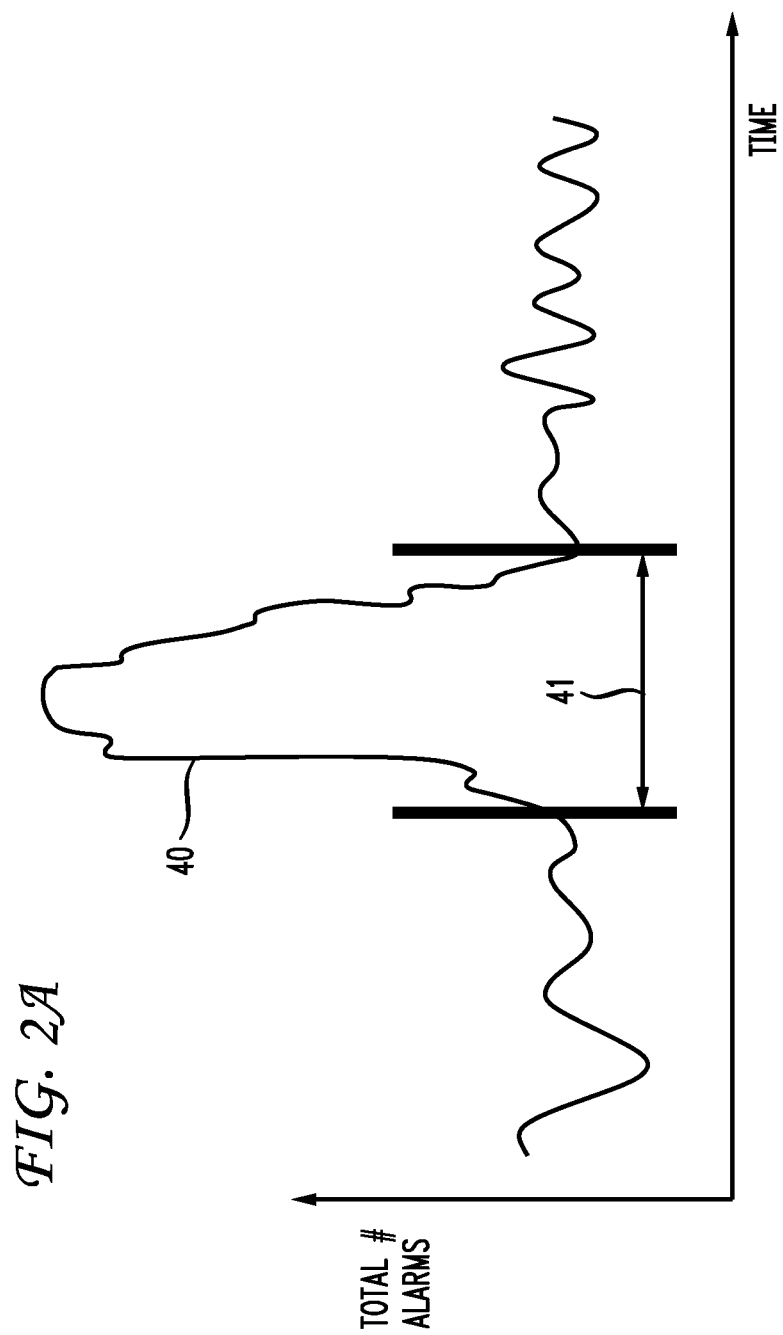

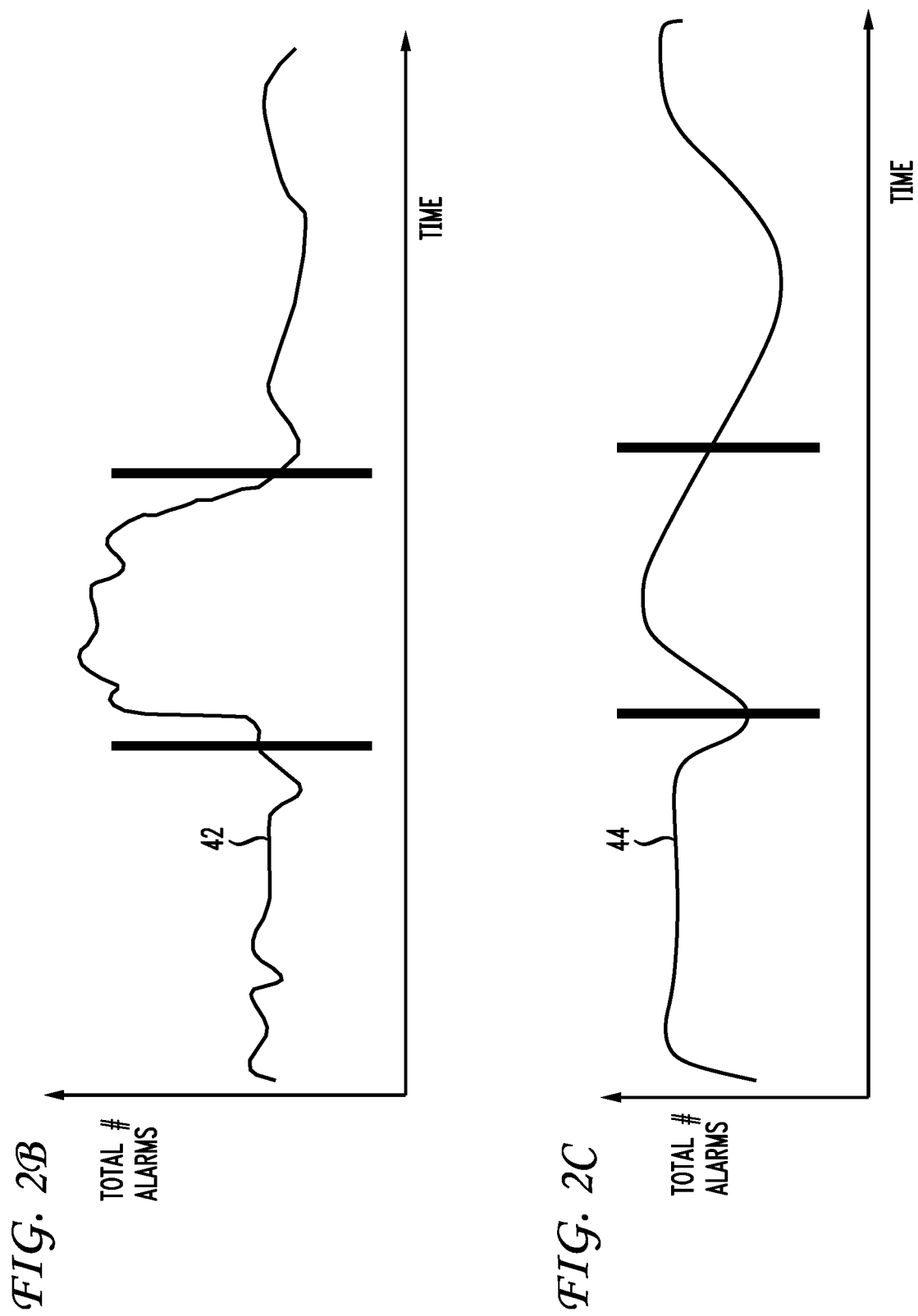

FIG. 3

| Type | 0 Hour | 1H | 2H | 3H | 4H | 5H | 6H | 7H | 8H | 9H | 10H | 11H | 12H | 13H | 14H | 15H | 16H | 17H | 18H | 19H | 20H | 21H |
|---|---|---|---|---|---|---|---|---|---|---|---|---|---|---|---|---|---|---|---|---|---|---|
| ? ? ? ? ? ? ? ? ? ? ? ? ? | | | | | | | | | | | | | | | | | | | | | | |
| 1.3.6.1.4.1.74.2.25.2-6.6 | | | | | | | | | | | | | | | 213 | 749 | 662 | 399 | | | | |
| 1.3.6.1.4.1.74.2.46.200.65.10.6.1 | 24 | 23 | 25 | 24 | 24 | 24 | 35 | 31 | 23 | 24 | 25 | 20 | 32 | 20 | 24 | | 27 | 40 | 32 | 32 | 25 | 5 |
| GOSNEMO-6-349, | | 2 | 1 | | | | | | | | 2 | | | 1 | 1 | | | 1 | | | 2 | |
| GRAS_FGW-6-1, | | | | | | | | | | | | | | | | | | 3 | | | | |
| GRAS_LIG-6-1, | 871 | 850 | 812 | 1035 | 762 | 923 | 321 | 796 | 1385 | 436 | 1789 | 352 | 272 | 523 | 470 | 1121 | 769 | 492 | 660 | 395 | 777 | 78 |
| GRAS_RIG-6-1, | 36 | 50 | 52 | 15 | 12 | | | 3 | 3 | | 6 | 6 | 12 | 6 | 6 | 6 | 9 | 77 | 112 | 95 | 99 | 8 |
| GRAS_SGW-6-1, | 37 | 38 | 44 | 38 | 41 | 38 | 41 | 44 | 41 | 38 | 38 | 41 | 41 | 40 | 22 | 32 | 44 | 39 | 41 | 41 | 38 | 4 |
| GRAS_VIG-6-1, | 44 | 44 | 44 | 44 | 44 | 44 | 44 | 44 | 44 | 44 | 44 | 45 | 45 | 44 | 22 | 27 | 24 | 45 | 44 | 44 | 44 | 4 |
| INMS_ADMIN-6-3 | 24 | 24 | 24 | 24 | 24 | 24 | 24 | 24 | 24 | 24 | 24 | 24 | 24 | 24 | 24 | 24 | 24 | 24 | 24 | 24 | 24 | 2 |
| Multiple-Numbers | 1 | | 6 | | 4 | 3 | 9 | | | | | | | 93 | 126 | 24 | 104 | 12 | 24 | 3 | 3 | 2 |
| Multiple-T1-Failures | 12 | 9 | 15 | 3 | | | | | | 9 | | 24 | 22 | 14 | 12 | 6 | | | 3 | | | |
| NEMODEDICATED-6-647 | | | | | | 4 | 2 | 2 | 1 | | 2 | 9 | | 19 | 14 | 12 | 8 | 2 | | 3 | | |
| NEMODEDICATED-6-649 | | | | | | | | | 2 | | | 1 | 1 | 5 | 5 | 12 | | 7 | 2 | 5 | | |
| NEMOISP-6-547, | | 2 | | | | 6 | 3 | 3 | 8 | 18 | 11 | 7 | 51 | 165 | 163 | 37 | 38 | 3 | | | | |
| NEMOISP-6-549, | 4 | 3 | | 7 | 7 | 1 | | | 5 | | | | 11 | 11 | 16 | 27 | | 4 | 5 | 12 | 7 | |
| NEMONEMO-6-247, | | | 15 | 1 | 2 | | | 3 | | 4 | | | 17 | 16 | 25 | 47 | 34 | 6 | 6 | 5 | | |
| NEMONEMO-6-249, | | | | | | | | | | | | | | | | | | | | | | |

TO FIG. 3 (CONTINUED)

METHOD AND SYSTEM FOR DETECTING AND MANAGING A FAULT ALARM STORM

BACKGROUND OF THE INVENTION

1. Field of the Invention

The present invention relates to a method and system for managing a fault alarm storm in a network communication system, and more particularly to a system and method for managing a fault alarm storm by identifying the alarms and processing the alarms to maintain network performance.

2. Brief Description of the Related Art

Network services, such as IPTV, VOIP, and high speed internet, require high performance network equipment in complex networks. Outages can occur due to physical problems and/or logical errors. Planned maintenance and failures significantly impact customers with lengthy downtimes as network operators upgrade software. Due to interconnections between network components, when one component fails, many elements may be affected. Therefore, one failure can lead to multiple alarms being generated. In particular, a burst volume of alarms may be generated due to device hardware/software failures or network-wide communication breakdowns.

For example, when a network encounters an abnormal situation, such as multiple cable cuts, a network management system may be overwhelmed with alarms. The excessive alarms may cause the upstream alarming and ticketing systems central processing unit to create a bottleneck that will impact network center operations. When the failures and the resulting alarms occur in large quantities this results in what is known as an alarm storm. The alarm storm may be so severe that the processing power needed to process the alarms outstrips the processing capacity of the network and network performance is severely degraded. In extreme cases, the entire network operations may crash due to an alarm storm.

Alarm handling systems that are known in the art typically try to process the alarms as fast as they can and eventually run out of processing capacity or memory. Some of the prior art systems try to correlate all the alarms. But because so many alarms come in so fast, the system may run out of power and desired results cannot be generated in time for trouble shooting. One way to handle this problem is to upgrade to more powerful machines. However, this can be expensive and may provide only a short term solution to the problem.

Accordingly, it would be desirable to have an alarm fault management system with the ability to detect an alarm storm before a network management system is impacted, thereby increasing the capacity of a fault management system and maintaining overall network performance.

SUMMARY OF THE INVENTION

The present invention provides a method and system of detecting and managing fault alarms.

The present invention provides a method and system of managing network alarms including associating an alarm type with a plurality of network alarms using information associated with the plurality of network alarms, the information comprising a quantity of the plurality of network alarms and a cause of the plurality of network alarms; and processing the plurality of network alarms based on the alarm type associated therewith.

The present invention further provides a method of managing alarms on a network including the steps of tracking alarms generated by network elements; determining if a predetermined rate of alarms is exceeded; in response to the predetermined rate being exceeded, analyzing network alarms to determine an alarm type based on a rate and cause of the alarms; storing the alarms corresponding to a first alarm type in a buffer; and processing the alarms from the buffer at a predetermined rate.

The present invention still further provides a system for managing alarms on a network including an alarm data collector module for collecting alarm data from the network and an aggregator module for tracking the collected alarm data. An analyzer module is provided for analyzing the alarm data and determining alarm types. An alarm processor module performs an alarm processing algorithm to process the alarms in response to the determination of the alarm type.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 2A is a representation of a first type of alarm storm wave.

FIG. 2B is a representation of a second type of alarm storm wave.

FIG. 2C is a representation of a third type of alarm storm wave.

DETAILED DESCRIPTION OF THE PREFERRED EMBODIMENTS

Figure 1:
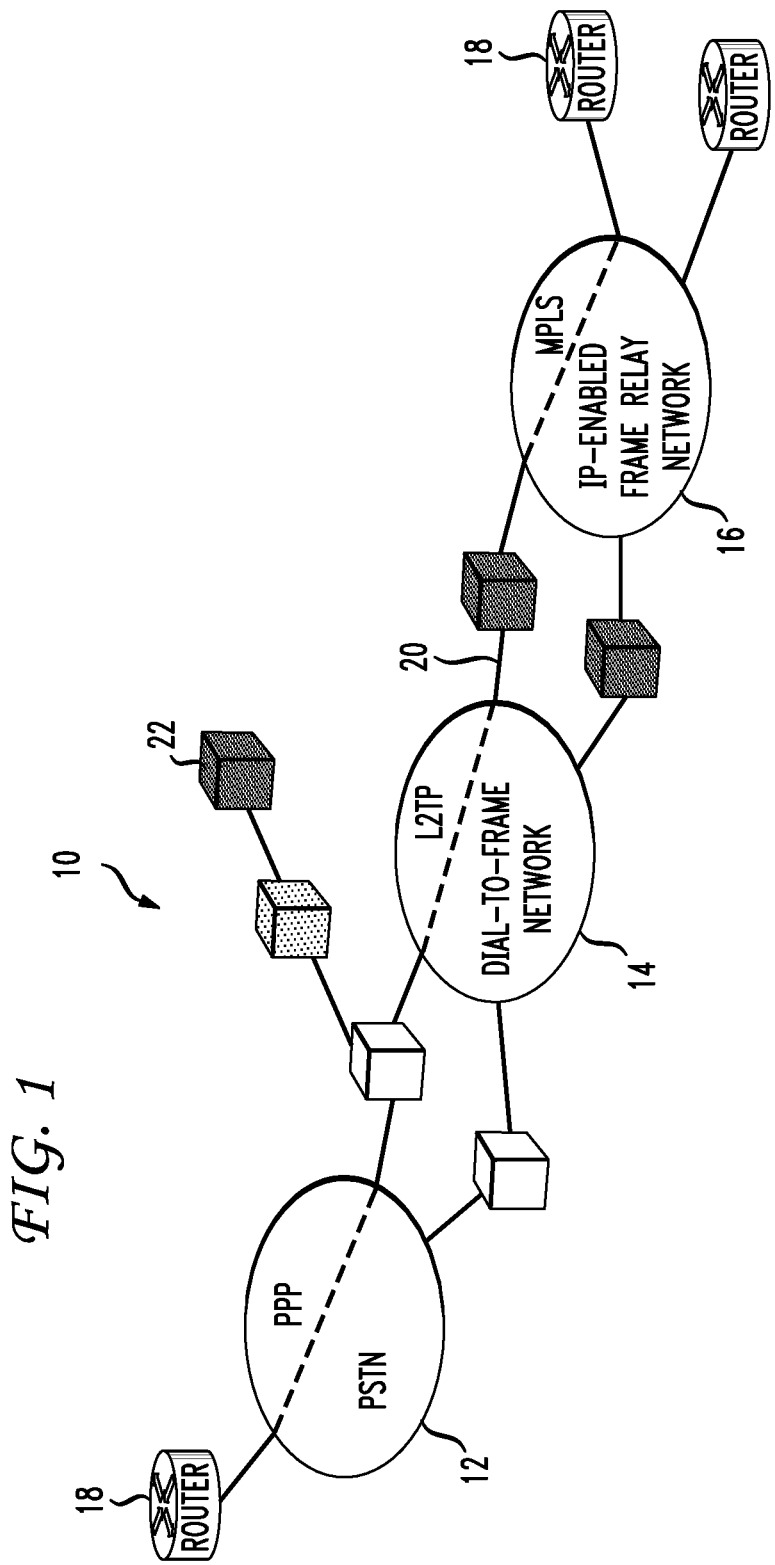
FIG. 1 is a block diagram of a complex network that includes a plurality of interconnected networks.

The present invention provides a system for handling a high volume of alarms generated in a communication system. The communication system may include one or more interconnected networks. For example, as shown in FIG. 1, a complex network 10 may include a phone network (PSTN) 12, a dial-to-frame network 14 and an IP enabled frame relay network 16. Various VPN (virtual private network) routers 18 may be connected to the networks. The network and the various elements may be interconnected by connectivity components 20, such as fiber optic cables. A service manager 22 is preferably connected to the networks to help manage the network.

Figure 7:
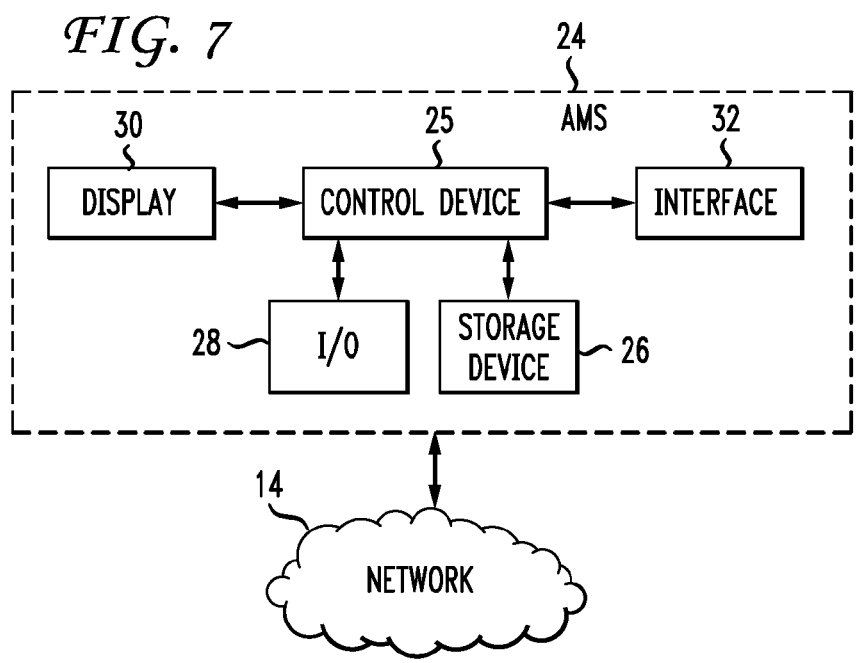
FIG. 7 is a functional block diagram of an alarm management system of the present invention.

The service manager 22 preferably includes an alarm management system 24 ("AMS"). With reference to FIG. 7, the AMS may include a control device such as a microprocessor, microcontroller, ASIC, etc., which is operably connected to a memory storage device 26. The memory storage device 26 may be located separate from the control device 25 and/or be part of it. An I/O entry device 28, such as a keyboard or mouse may be operably connected to the control device. A display device 30 may also be operably connected to the control device 25. The AMS may further include a network interface device 32 to permit the system to communicate with a network 14, such as the internet.

When a fault occurs on a network, an alarm, or series of alarms, are preferably generated and received by the AMS 24. The AMS may then process the alarms and permit the problem to be resolved. Alarms may be generated due to device hardware and/or software failures or network-wide communication breakdowns. When the number and frequency of alarms exceed the ability of the AMS to respond to the alarms, the service manager may become overloaded and the network performance will be detrimentally impacted. In order to prevent this, the present invention provides for an AMS that includes a method and system for handling the high volume of alarms without allowing the network to be affected.

The present invention preferably automatically detects when an alarm storm is occurring and responds to the alarms in such a manner that the communication system and various networks are not impacted. The present invention categorizes various kinds of alarms into alarm types and processes the alarms based on their type.

In a preferred embodiment of the present invention, the AMS provides an alarm storm detection function and an alarm storm management function. The alarm storm detection function monitors the rate of autonomous alarm notifications from the network. If the rate of autonomous notifications exceeds a specified predetermined threshold, then the alarm storm management function will be triggered and remain in operation until the alarm rate drops to a safe level. In one preferred embodiment, the alarm rate hitting the receiver is the trigger condition and this rate is monitored. Alarms correspond to faults in the network. When the alarm rate hitting the receiver exceeds a predetermined amount, an alarm storm is occurring and the alarm storm management function may be triggered. If the alarm rate is greater than X number per Y minutes for continuous Z cycles, then the alarm storm management function begins. For example, every 100 alarms received in 10 minutes will be defined as 1 cycle. If from 10 AM-10:30 AM, 2 such cycles occur (10-10:10 and 10:15-10:25), then the alarms storm management function may be initiated.

Once the alarm storm management function is initiated, alarms generated by the network are tracked. An accounting of the number of alarms and the source or element causing the alarms is made and stored in memory. This alarm information is then analyzed over time to determine alarm types. Alarm storms fall into certain wave-like patterns depending on the type of alarms causing the storm. With reference to FIG. 2A, an alarm storm pattern 40 of type 1 alarms typically has a high volume but increases many times during an alarm storm period 41. Type 1 alarms may include various kinds of alarms such as protocol alarms among routers, and network events, e.g., a communication cable cut. Protocol alarms are typically high in number; however, protocol alarms increase tremendously during the type 1 alarm storm. A type 1 alarm storm will also typically involve many network elements.

With reference to FIG. 2B, a type 2 alarm storm pattern 42 which is made up of type 2 alarms typically has a relatively low volume but increases many times during the storm period. For instance, the failures of device components constitute type 2 alarms and typically are included in this category. As shown in FIG. 2C, a type 3 alarm storm pattern 44 formed of type 3 alarms has a relatively steady state of alarms which may be high or low. For example, type 3 alarms may include alarms that are generated by an element management system to poll various devices. These type 3 alarms are normally fixed for a given polling cycle. Type 3 alarms may also include the kinds of alarms that need not or can not be addressed by the AMS.

Figure 3:
FIG. 3 is a table of exemplary alarm data tracked by an alarm management system in accordance with the present invention.

The tracked fault alarms are preferably used to populate a fault alarm dataset 50 as shown, for example, in FIG. 3. The dataset 50 includes the number of alarms 52 for various network elements 54 at given time intervals 56. The network elements 51 may include entire networks. For example, as shown in network element "ptn2Sgifreemanagementsnmpv1-6-40" (58) the alarms increase from 91 at hour 11 to 317 at hour 13. This severalfold increase in alarms from a relatively high number of alarms indicates a type 1 alarm storm. In hour 13, the alarm number reaches 2226 and remains above 500 for several more hours. Evidence of a type 1 alarm storm can also be seen in network element "PTN2SGIFREEMANAGEMENTSNMPV1-6-40" (60) wherein the number of alarms at hour 11 of 132 increases to 898 at hour 12. Network elements 58 and 60 represent entire networks. Therefore, fault alarms generated and caused by these elements indicate a significant fault in a network or communication between networks and categorized as type 1 alarms. This indicates an alarm storm formed of type 1 alarms. For example, if several network elements are generating a large number of type 1 fault alarms over a given time or a network itself is generating type 1 alarms, then this scenario indicates a type 1 alarm storm. If each of these alarms were to be processed as they occurred, the network processing would be severely overloaded and network performance would suffer.

A type 2 alarm storm which includes type 2 alarms is typically caused by a failure of a single or limited number of network elements. For example, in FIG. 3, network element "Multiple-Numbers" (62) and "NEMOISP-6-549" (64) are single network elements and are experiencing a type 2 alarm wave between the $13^{th}$ and $15^{th}$ hours. Network element Multiple-T1-Failures (66) represents an example of secondary alarms which are redundant. Such redundant type 3 alarms make up a type 3 alarm storm.

Accordingly, the typical behavior of the alarms may be used to determine the type of alarm. For example by detecting the cause of the alarm, e.g., network or network component or device, and rate of the alarms, the alarms can be categorized into alarm types and processed accordingly.

In addition to categorizing the alarm type based on the cause of the alarm, the present invention further permits the categorization of alarms based on an event triggering the alarm. Alarms which are caused by events beyond the network provider's control while perhaps generating a large number of alarms at a high rate may be treated as type 3 alarms and ignored. Processing power need not be expended on handling such alarms since ultimately the solution falls beyond the network provider's control. For example, the system may also set up a web service request with the local utilities, e.g., electric, gas, and water, which would allow it to query for real-time status for any particular geographical area. If the system gets a large number of alarms from several switches in the same vicinity, it will query the utilities to see if the alarms are a result of events such as construction, repair, and downed utility lines. Alarms caused by an event such as power failures, for example, may be categorized as type 3 alarms and filtered out, since the network provider cannot affect the repair. However, accidental cable cuts, such as those that occur during construction may be categorized as type 1 alarms. The network provider may have to respond to such a cut in order to affect a repair. Therefore, alarms resulting from such a fault are not filtered out. Such information regarding the cause of the alarms may be received by a technician and entered into the AMS. Alternatively, information as to the event triggering the alarms may be automatically communicated to the AMS through appropriate hardware and software.

Figure 4:
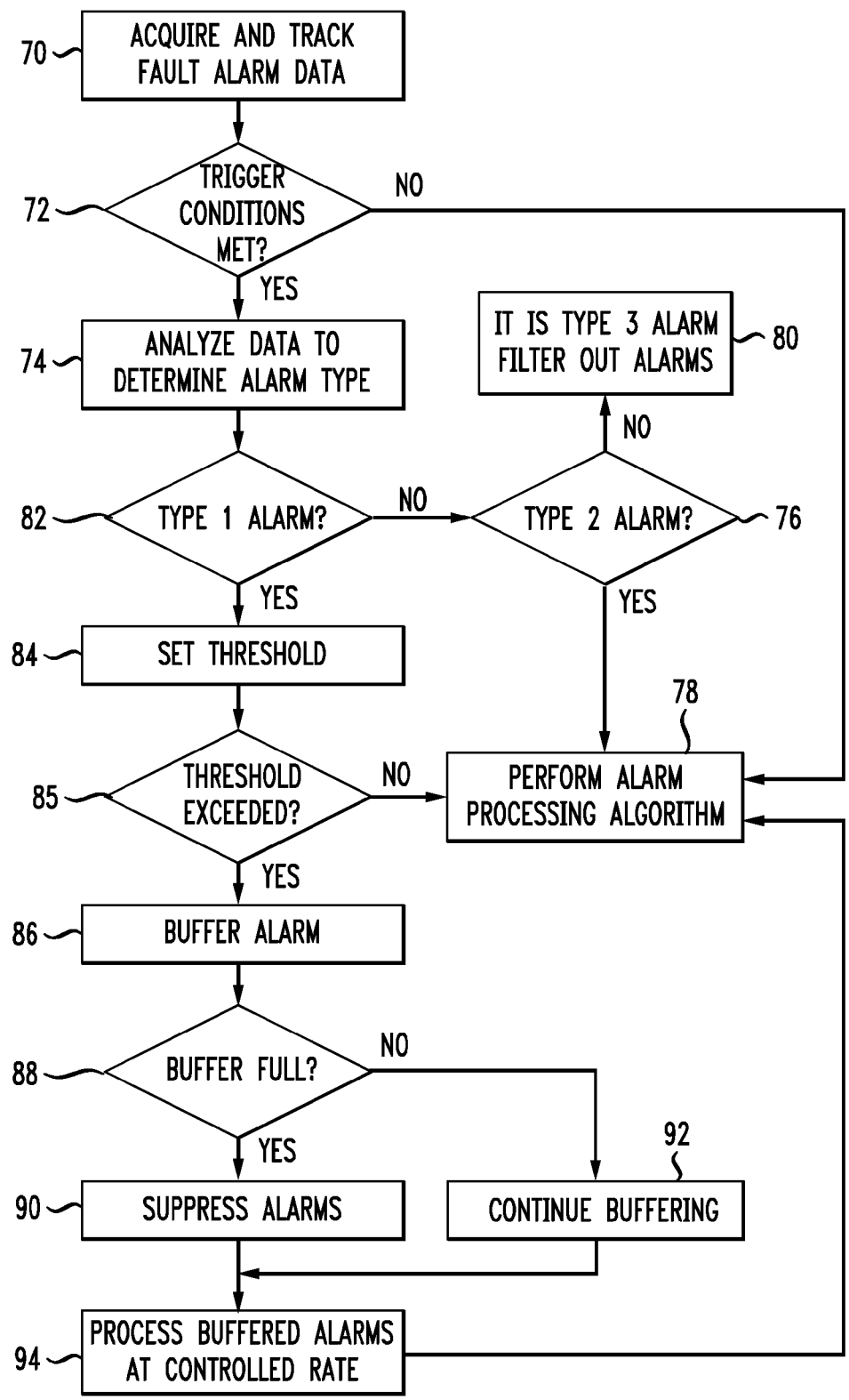
FIG. 4 is a flow chart of the alarm management system of the present invention.

With reference to FIG. 4, the alarm storm detection and management method of the present invention is shown. During an alarm storm detection stage, fault alarm data is acquired, stored and tracked over time 70 by the AMS. The AMS determines whether the rate of alarms exceeds a specified threshold 72. If so, then the alarm storm management methodology is triggered. If the trigger condition is not met, then the alarms are processed as they occur using an alarm processing algorithm 78, described in further detail below.

When the trigger condition is met and the alarm management methodology is initiated, the data is analyzed to determine the type of alarms 74. If a type 2 alarm is detected 76, this means that the volume of alarms is relatively low, but the alarms are still critical since they are mostly targeting a single or limited quantity of specific devices. Type 2 alarms are processed as they occur in accordance with an alarm processing algorithm 78.

If the alarms are detected to be type 3 alarms 80, these alarms may be filtered out since they are mostly redundant or are caused by events outside of the network provider's control and need not be processed. Accordingly, type 2 and 3 alarm types typically have a manageable number of alarms so that they may be handled as they occur. However, an alarm storm of type 1 alarms, due to the number and frequency of alarms which require processing, is capable of overloading the AMS and detrimentally affecting the performance of the network.

When the AMS detects an alarm storm of type 1 alarms is occurring, 82, various steps are taken to manage the large burst of alarms. An alarm threshold may be set 84, which may be based on the ability of the system to handle a rate of alarms without affecting the network. The alarm threshold may be defined by X number of alarms received in Y minutes for Z consecutive cycles. A robust AMS with a large amount of processing capacity will be able to process more alarms than a system with less spare processing capacity. The threshold then may be a predetermined value set for a particular system. Alternatively, the threshold value may be a dynamic value that is determined based on excess processing capacity. During times of excessive processing usage, little reserve capacity may be available to handle a burst of alarms. Therefore, the threshold value may be lower than during times of low processing usage.

A determination is made as to whether the threshold is exceeded 85. When the alarm threshold is exceeded, alarms are held in a buffer 86, and are not processed as they occur, i.e., in real time. Therefore, the network performance is preserved even when a type 1 alarm storm is occurring. In an alternative embodiment, after the trigger condition of step 72 is met, the alarms categorized as type 1 alarms may be buffered without employing the alarm threshold of steps 84 and 85. A determination may be made if the buffer is full 88, and if so, then incoming alarms may be suppressed 90 while the threshold condition is unchanged. If the buffer is not full, then alarms may continue to be buffered 92. When the number of alarms falls below the threshold condition for a predetermined number of cycles, the alarm buffer is preferably released and the alarms may then be processed. It is also within the contemplation of the present invention that while type 1 alarms are buffered during an alarm storm to prevent negative effects to the network, alarms may continue to be processed at a controlled rate 94 which can be safely and effectively handled by the AMS. The alarms may be processed using the alarm processing algorithm 78.

In addition, it is possible that a complex network may be subjected to alarms of the varying types at the same time. It is within the contemplation of the present invention that the alarms generating the type 1 alarms would be buffered as set forth above, and the type 2 or type 3 alarms may be handled by the alarm processing algorithm as they occur.

Figure 5:
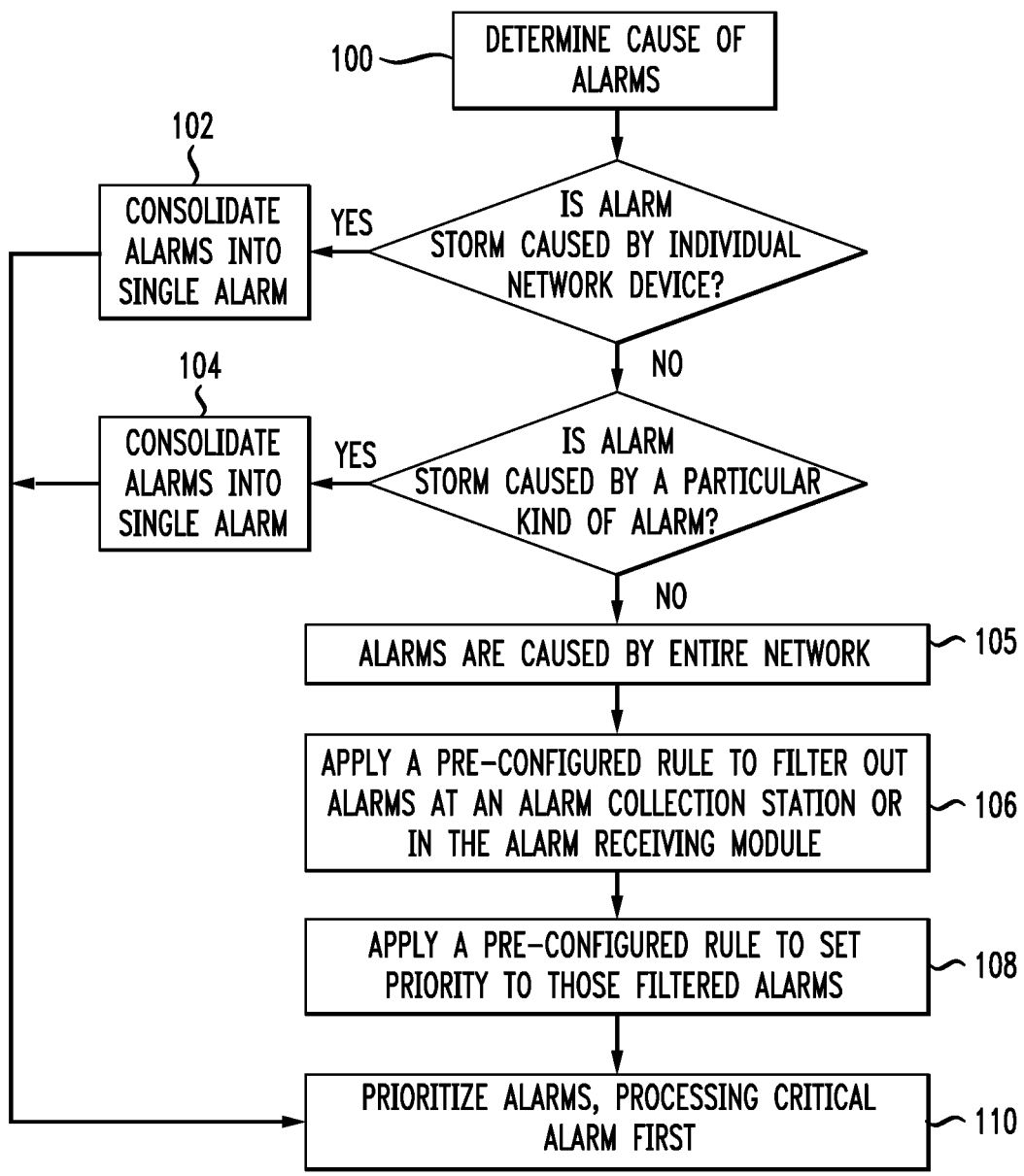
FIG. 5 is a flow chart of the alarm processing algorithm of the present invention.

The alarms are preferably processed by the AMS according to the following alarm processing algorithm. With reference to FIG. 5, the cause of the particular alarm is determined 100. If an alarm is caused by an individual device, instead of generating a number of individual alarms, a consolidated single alarm may be generated for that device 102. If alarms are caused by a particular kind of alarm, such as a loss of signal or interface down, a single alarm may be generated for that alarm kind 104. If an alarm is caused by an entire network 105, then a pre-configured rule is applied to filter out alarms at an alarm collection station or in the alarm receiving module 106. In addition, a pre-configured rule is preferably applied to set the priority to those filtered alarms 108. Alarms may then be prioritized such that critical alarms, such as those affecting critical network elements, may be handled first 110.

Alarms may be prioritized based on a set of criteria such as speed/bandwidth of the port, type of switch, the type of alarm, and customer. An alarm on an OCx port (which supports multiple customers) is typically more significant and critical than, for example, an alarm on a DS0 port (one customer). So alarms from ports that have greater bandwidth may be assigned higher priority. With regard to switches, an alarm on a backbone switch in the network is typically more important and critical than an alarm on a small edge switch in the network because it would impact a large number of customers. Therefore, alarms on a backbone switch may be assigned higher priority. With regard to types of alarms, objects in the network may be modeled in a hierarchical manner and assigned priority weights based on its expected impact. A switch or card (which supports several customers) going down alarm is typically more important and critical than an alarm on a PVC which impacts just one customer. Therefore, alarms from elements which have higher priority may be processed first.

With regard to the customers, service level agreements ("SLA") may exist with customers, and these agreements may dictate which alarms are to be handled first. Therefore, alarms may be processed based on SLA's.

The severity of the alarms may also be factored into determining priority of alarm handling. Alarms may be assigned different weights/priorities based on severity of the incoming alarm. Alarms with higher priorities, e.g., critical and major, may be processed first. Lower severity alarms (Minor, Warning) will be held in a low priority queue to be processed later.

The handling of alarms may also include determining if a particular object in the network alarms more than X times in Y seconds, and if so, further processing of any alarms on that object will be stopped for Z seconds. A chronic/smart alarm on that object may then be created so that a technician may troubleshoot and resolve the problem.

In addition, if there are a large number of threshold crossing alarms, the system may automatically troubleshoot to see if it is a badly configured object, or if the threshold settings are set too low, or if there is no bandwidth/capacity. In this way, the number of alarms to be processed can be reduced.

The alarm processing may also include consolidating alarms. Consolidating the alarms in accordance with the alarm processing algorithm includes an accounting thread for determining and storing the alarm counts at each device level. A flag is then set for a processing thread to determine if a new alarm shall be created at a particular device level. For example, a switch could have the following levels of devices:

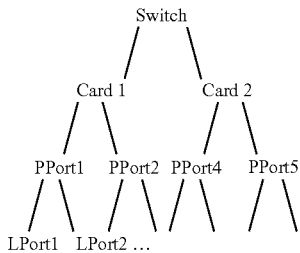

On receiving an alarm from the network, the accounting thread, based on the information associated with the alarm, preferably determines which device the alarm is coming from. If it is from the PPort1, the alarm count of PPort1 and its parent devices, such as Card1 and Switch in the hierarchical tree shall also be increased by one.

Based on pre-configured thresholds, the accounting thread preferably sets the Flag to a device, for example Flag=Card1, which means that even if this alarm is coming from a PPort, because so many alarms are affecting Card1 at this particular time (alarm storm at Card1 level), a Card alarm will be generated. Thus, many PPort alarms will result in only one single Card alarm. In a normal situation (no alarm storm), each PPort alarm will generate a distinctive alarm.

The algorithm to set the Flag is based on how many alarms are associated with a device in a pre-determined period. For example, if five alarms are issued concerning a port within 2 minutes, the PPort alarms are preferably consolidated to a higher level, namely Card.

The alarm processing of the present invention may include additional features to assist in the efficient handling of the alarms. Therefore, the processing of alarms may be enhanced if the cause of the alarm is determined. Network alarms may be caused by events occurring in a particular geographical area. For example, hurricanes, earthquakes or large scale power outages will have a major impact on networks. If there are several alarms from different devices in a particular geographical area, the AMS managing the network may look for an underlying layer 1 facility/transport problem and correlate all the alarms to the root cause facility failure (CDC).

Additionally, in one embodiment of the present invention, the AMS may set up a web service request. For example, if the AMS receives a large number of alarms from several switches in the same vicinity, it may query the National Weather Service for a real time weather status to determine if the alarms are a result of any natural disaster, e.g., hurricane, earthquake, etc. Alarms resulting from such events may be treated as type 3 alarms and discarded. These events are beyond the control of the network provider and system resources do not need to be expended in processing them.

Once the cause of the alarms can be identified the resulting volume of alarms can be correlated and consolidated. Therefore, an event which may generate a large number of alarms can be reduced to a single or smaller number of alarms. In this way, the network is not overwhelmed with processing individual alarms. In addition, such web service requests receive information allowing the cause of alarms to be determined and repairs to the network to be made in a timely manner.

Figure 6:
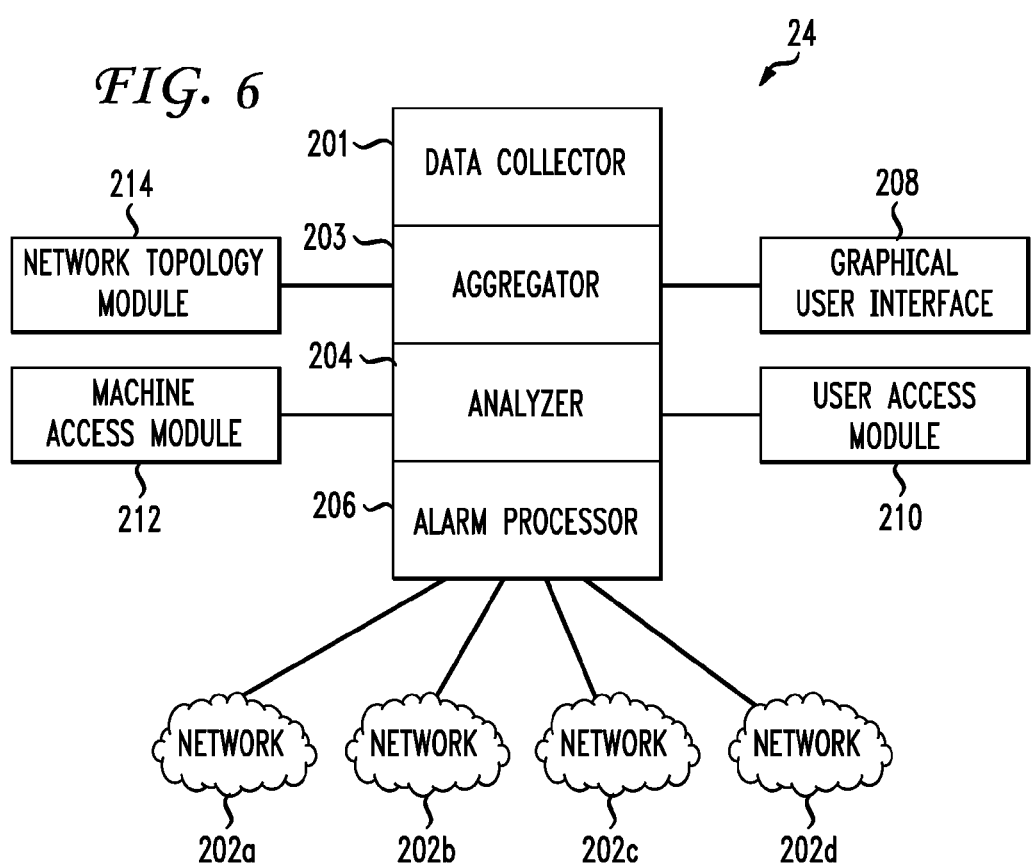
FIG. 6 is a block diagram of an alarm management system of the present invention.

With reference to FIG. 6, the AMS 24 of the present invention may include various modules including an alarm data collector module 201, which acts as an alarm collection station and collects the alarm data from the network and/or networks. The AMS 24 is operably connected to one or more networks 202a-d. An aggregator module 203 may be included, which takes the alarm data and tracks it over time. The aggregator module 203 would process the alarm data to create a table of data, such as that represented in FIG. 3. An analyzer module 204 analyzes the data and determines the alarm types based on the source and the rate of the alarms. An alarm processor module 206 performs the alarm processing algorithm and processes the alarms. The alarm data collector, aggregator analyzer and alarm processor modules may include a combination of hardware and/or software to be implemented. The system may also include a graphical user interface 208. A user access module 210 and machine access module 212 may also be provided to permit the system to be accessed. The system may also include a network topology module 214 for determining the hierarchical level of the network devices. This information, for example, may be used to consolidate alarms.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method of managing network alarms in an electronic communication network having an alarm management system comprising a control device operably connected to a memory device and a network interface device, the alarm management system being in communication with the electronic communication network and operative to receive and process network alarms, the method comprising:

determining, by the alarm management system, an alarm type associated with a plurality of network alarms using information associated with the plurality of network alarms, the information comprising at least one of (1) a quantity of the plurality of network alarms during a period of time, (2) a cause associated with the plurality of network alarms, (3) a network object associated with the plurality of network alarms, and (4) a capacity of a network provider to redress the plurality of network alarms;

categorizing the plurality of network alarms into alarm types in response to a determination that a predetermined rate of alarms is exceeded;

processing the plurality of network alarms based on the determination of alarm type; and setting a threshold number of alarms, and if the threshold is exceeded, storing alarms of the first type in a buffer in response to a determination that the plurality of network alarms are of a first alarm type;

consolidating the network alarms associated with a particular network object into a single alarm, thereby facilitating the handling of the network alarms and reducing the effects of a multiplicity of network alarms generated by a network alarm storm; and suppressing incoming alarms in response to the buffer being full.

2. The method as defined in claim 1, further comprising: tracking alarms associated with network elements and storing data relating to the alarms for determining the alarm type.

3. The method as defined in claim 1, further comprising: processing the network alarms stored in the buffer at a controlled rate.

4. The method as defined in claim 1, further comprising:
processing the alarms of the second alarm type in response to a determination of a second alarm type.

5. The method as defined in claim 1, further comprising:
filtering out alarms of the third alarm type response to a determination of a third alarm type including alarms which a network provider lacks capacity to redress.

6. A method of managing alarms on a network comprising:
tracking network alarms generated by network elements;
determining if a predetermined rate of network alarms is exceeded;
analyzing network alarms, using information associated with the plurality of network alarms, the information comprising at least one of (1) a quantity of the plurality of network alarms during a period of time, (2) a cause associated with the plurality of network alarms, (3) a network object associated with the plurality of network alarms, and (4) a capacity of a network provider to redress the plurality of network alarms, to determine an alarm type based on a rate and source of the network alarms in response to the predetermined rate being exceeded;
categorizing the plurality of network alarms into alarm types in response to a determination that a predetermined rate of alarms is exceeded;
setting a threshold number of alarms, and if the threshold is exceeded, storing the alarms corresponding to a first alarm type in a buffer in response to a determination that the plurality of network alarms are of a first alarm type;
suppressing incoming alarms in response to the buffer being full;
processing the alarms from the buffer at a predetermined rate;
determining the cause of the alarms; and
consolidating the alarms caused by a particular network device into a single alarm in response to the cause of the alarms being the particular network device.

7. The method of claim 6, further comprising consolidating alarms of a particular kind into a single alarm.

8. The method of claim 6, further comprising:
prioritizing the alarms to process critical alarms first.

9. The method as defined in claim 6, further comprising:
determining the cause of the alarms;
consolidating alarms caused by the same device, and generating a single alarm; and
consolidating alarms of like kind, and generating a single alarm.

10. The method as defined in claim 6, further comprising:
processing the alarms by consolidating alarms caused by a single network element into a single alarm in response to a second alarm type.

11. The method as defined in claim 6, further comprising:
filtering out a third alarm type.

12. A system for managing alarms on a network comprising:
a control device operably connected with a memory device and a network interface device, the control device in communication with the network and operative to receive and process network alarms, the control device implementing
an alarm data collector for collecting network alarm data from the network;
an aggregator for tracking the collected network alarm data;
an analyzer for analyzing the network alarm data and determining network alarm types, the network alarm data comprising at least one of (1) a quantity of the plurality of network alarms during a period of time, (2) a cause associated with the plurality of network alarms, (3) a network object associated with the plurality of network alarms, and (4) a capacity of a network provider to redress the plurality of network alarms; and
an alarm processor performing an alarm processing algorithm to process the alarms in response to the determination of the alarm type, categorizing the plurality of network alarms into alarm types in response to a determination that a predetermined rate of alarms is exceeded, the alarm processor consolidating the network alarms associated with a particular network object into a single alarm, setting a threshold number of alarms, and if the threshold is exceeded, storing alarms of the first type in a buffer in response to a determination that the plurality of network alarms are of a first alarm type, and suppressing incoming alarms in response to the buffer being full, thereby facilitating the handling of the network alarms and reducing the effects of a multiplicity of network alarms generated by a network alarm storm.

13. The system as defined in claim 12, further comprising the analyzer being to determine the alarm type based on a source of the alarms.

14. The system as defined in claim 12, further comprising a graphical user interface.

15. The system as defined in claim 12, further comprising a user access and machine access.

16. The system as defined in claim 12, further comprising a network topology for determining a hierarchical level of the network devices.

* * * * *